United States Patent [19]

Shaw et al.

[11] 4,269,437
[45] May 26, 1981

[54] JOINTING OF PIPES

[75] Inventors: Douglas W. Shaw; Richard Gamwell, both of Macclesfield, England

[73] Assignee: E. T. Oakes Limited, Macclesfield, England

[21] Appl. No.: 80,297

[22] Filed: Oct. 1, 1979

[30] Foreign Application Priority Data

Oct. 4, 1978 [GB] United Kingdom ............... 39270/78

[51] Int. Cl.³ ............................................. F16L 19/00
[52] U.S. Cl. ................................. 285/109; 277/235 R; 285/55; 285/354; 285/363; 285/369; 285/398
[58] Field of Search ............... 285/109, 398, 397, 370, 285/371, 235, 334.2, 334.3, 55; 277/235 R

[56] References Cited

U.S. PATENT DOCUMENTS

| 2,261,566 | 11/1941 | Russell et al. ............... 285/371 X |
| 2,416,657 | 2/1947 | Trevaskis ........................ 285/109 |
| 2,828,979 | 4/1958 | Wiltse ............................. 285/109 |
| 3,246,920 | 4/1966 | Pall ............................. 285/371 X |
| 3,276,792 | 10/1966 | Dunton .......................... 285/109 |
| 3,521,913 | 7/1970 | Verhein et al. ................ 285/109 |

FOREIGN PATENT DOCUMENTS

| 523106 | 10/1953 | Belgium ......................... 285/109 |
| 2102520 | 8/1971 | Fed. Rep. of Germany ........... 285/109 |
| 1335488 | 7/1963 | France ........................... 285/55 |
| 627278 | 8/1949 | United Kingdom ................ 285/235 |
| 705415 | 3/1954 | United Kingdom ................ 285/109 |
| 836825 | 6/1960 | United Kingdom .............. 285/334.2 |

Primary Examiner—Thomas F. Callaghan
Attorney, Agent, or Firm—Fleit & Jacobson

[57] ABSTRACT

A joint for jointing the ends of two pipes, particularly lined pipes, in which a radial resilient portion extends between the two ends of the pipes, two oppositely extending axial portions at the radial inner part of the radial portion each engage within the interior of one of the two pipe ends. Construction of the joint is such that the axially extending portions of the joint are urged radially outwardly against the inner surface of the two pipe ends as the two pipe ends are drawn axially towards one another.

6 Claims, 24 Drawing Figures

JOINTING OF PIPES

DESCRIPTION

The present invention relates to the jointing of pipes.

Various methods have been proposed for jointing pipes, these including spigot and socket joints, stuffing box joints and many other types. Where two pipes are joined, there is clearly a discontinuity at the point where the two pipe ends meet. If the pipe is a lined pipe, then there will probably be a discontinuity in the lining at the ends of the pipes to be joined. It is important that a corrosive medium should not attack the end of the pipe joint, and special steps need to be taken to seal the ends of the pipes themselves.

It is now proposed, according to the present invention, to provide a means for jointing two pipe ends including an annular joint having a radial portion adapted to extend the ends of the pipe and two axially extending portions at the radially inner part of the radial portion, the axially extending portions engaging within the interior of the two pipe ends, the joint being arranged so that the axially extending portions are urged radially outwardly against the inner surface of the two pipe ends as the two pipe ends are drawn axially towards one another.

Such a construction ensures a complete seal between the joint itself and the two pipe ends and protects the very ends of the pipes, which may be unlined, from corrosive attack, particularly if the joint is made of a resilient material, such as a plastics material or rubber. Although the joint of the present invention is specifically designed for jointing two lined pipes, it is not restricted to such a jointing and equally could well be used on unlined pipes and provide a very satisfactory fluid tight seal between the two pipe ends.

It is contemplated that the means to urge the axially extending portions radially outwardly can take a number of different forms. Firstly, it could be a function of a special design of a reinforcing metal component in a resilient material joint.

This reinforcing metal component could, for example, be a single piece rigid ring of metal which is moulded inside the rubber or plastics material joint and may have an annular central body portion and two oppositely directed outwardly divergent arms at the radially outer end of the body portion and two oppositely directed radially outwardly divergent arms at the radially inner end of the body portion, whereby urging together of the pipe ends causes outward flexing of the divergent arms at the radially inner end of the body portion.

A further arrangement of this type includes a flexible version of the rigid reinforcing piece, in which the body portion includes two radially outwardly divergent body parts, the forcing together of the two pipe ends causing the body parts to be pushed towards one another increasing the outward flexing action of the set of arms to force the axial portion of the joint against the inner surfaces of the pipe ends.

This type may also include an annular reinforcement of I-beam cross-section, the radially outer surface of the radially inner flange of the I-beam and the radially inner surface of the radially outer flange of the I-beam being tapered, so that forcing together of the two pipe ends causes a wedging action.

A further construction of this type has its annular reinforcement so arranged as to have an axially extending flexible body part, two radially inwardly convergent body portions extending radially inwardly from the axial body part and two axially extending portions, the arrangement at the radially inner end of the inwardly convergent body portions being such that as the two pipes are pushed together the axially extending portions are again urged radially outwardly to enhance the sealing effect.

A second overall arrangement includes two rigid rings of metal moulded inside the rubber or plastics material jointing member, the body portions of the two rings diverging radially outwardly each having an inner and outer arm which again diverge outwardly.

In another type of joint, the reinforcement includes two parts each having an axially extending inner arm and a body portion extending radially outwardly therefrom, the two body portions diverging with respect to one another.

Advantageously a centering ring is located within the two axially extending portions and a central flange of the centering ring extends radially outwardly between the two radially extending body portions.

Preferably with any of the constructions described above, the reinforcement includes a plurality of slits circumferentially spaced from one another, said slits dividing the arms and body portions into circumferentially spaced segments.

A further construction involves a toroidally wound wire strip which is shaped to provide one of the previously described constructions.

A further type of joint involves no reinforcement but is a simple moulded rubber or plastics material ring, the ring having a cross-section so shaped that upon axial inward application of force by the two pipe ends the axially extending portion of the ring is radially outwardly. Various such constructions are described in detail hereinafter.

The radially outward force can further be applied by suitably shaping the ends of the pipes, for example by forming rounded ends or by chamfering. Furthermore, special attachments can be applied to the pipes to produce this effect and can act on portions of the jointing member to effect the radially outward force.

Any of the suggested joints could be supplemented with an adhesive. It is also contemplated that heat may be applied to effect a seal between a lining of the pipe and the plastics material of the jointing member.

In order that the present invention may more readily be understood, the following description is given, merely by way of example, reference being made to the accompanying drawings, in which.

Figure 1:
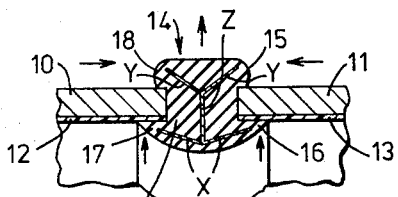
FIGS. 1 to 11 are schematic fragmentary cross-sectional views each illustrating different arrangements of joint according to the invention.

Referring first to FIGS. 1 to 11, there is illustrated in each Figure two pipe ends 10 and 11 provided with a lining of plastics material 12 and 13 respectively, the lining material extending along the inner wall surface of the pipe only and not over the end wall surfaces of the pipe. The joint 14 according to the invention is, in each instance, formed of resilient rubber or plastics material and provided with an inner reinforcement for example of metal and preferably of spring steel. The joints all have a central body portion 19 extending radially outwardly between the axial ends of the pipe and having two axially extending portions 16 and 17 at the radially inner portion of the body portion 19 and these axially extending portions engaging within the bore of the pipe against the lining 12 and 13. In the arrangement of FIGS. 1, 2, 3, 4 and 7 there is also an axially extending portion 15 and 18 extending outside the pipe ends 10 and 11.

The constructions of FIGS. 1 to 4 differ in the construction of the reinforcement. In FIG. 1 the reinforcement is a single piece of rigid material including a body portion Z having two outwardly divergent arms X at the radially inner portion and two outwardly divergent arms Y at the radially outer portion of the body. As the pipe ends 10 and 11 are drawn axially towards one another, as indicated by the arrows, the outer edges of the pipe tend to urge against the inclined arms Y to force the whole ring in a radially outward direction to force the portions 16 and 17 firmly against the wall of the lining. The ring may be split at intervals around the circumference to define circumferentially spaced segments to facilitate this radial outward movement.

Figure 2:
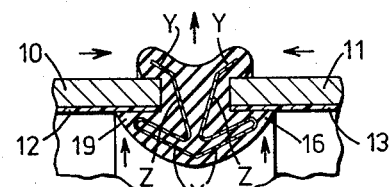

FIG. 2 is a flexible construction of the reinforcement, this including two outwardly divergent radial portions Z and arms X and Y generally similar to that described above. The ends of the pipe act against the divergent body portions Z to urge the axial part of the jointing member radially outwardly. The construction may again be split around its circumference to facilitate this action.

Figure 3:
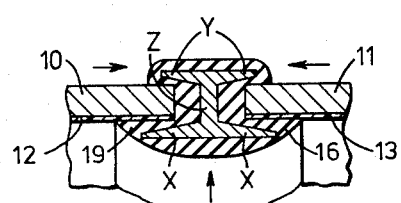

In FIG. 3 the reinforcement in the form of a rigid ring of I-cross section having an annular body portion Z and two pairs of arms X and Y as previously, the radially outer surface of the portions X and the radially inner surfaces of the portions Y being tapered as shown. The effect of this is to provide a wedging action between the axial portions 16, 19 and the lining 13, 12 respectively.

The construction of FIG. 4 again employs a single piece of reinforcing metal component having an axially extending annular part 21 with two radially inwardly convergent body portions 22 having at their radially inner ends arms 23 and 24, movement together of the pipe ends 10 and 11 bending the portions 22 towards one another at the outside and thus away from one another at the bottom to urge the surfaces 16 and 19 against the lining portions 13 and 19 respectively.

Figure 5:
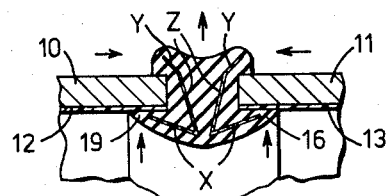

FIG. 5 shows a rather different construction in which the reinforcement is formed of two rigid pieces of identical construction, these each including a body portion Z having inner and outer divergent fingers X and Y respectively, the body portions Z diverging away from one another in a radially outward direction. Again it will be appreciated that forcing together of the pipe ends 10 and 11 will tend to pivot the divergent arms Z to force the axial portions 16 and 19 against the lining.

Figure 4:
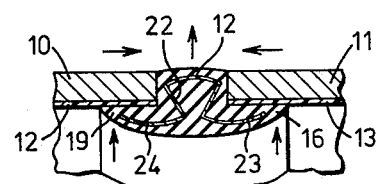

The constructions of FIGS. 1, 2 and 4 can each have circumferentially spaced splits to facilitate the deformation.

Figure 6:
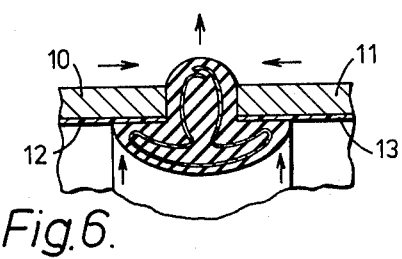
Figure 7:
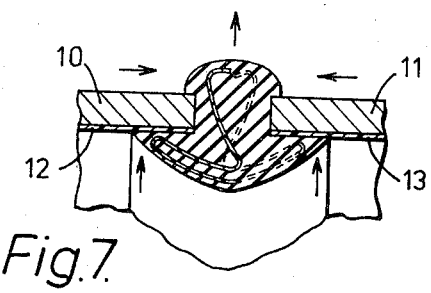

FIGS. 6 and 7 each indicate a simple wire or strip which is wound, in an annular complex helical manner, to form a toroidal spring member which in each instance has a body portion and radially inner arm portions which act in a similar manner to that described previously. By winding in an annular generally helical form deformation is greatly facilitated because each turn of the winding is effectively split from the adjacent turn.

Figure 8:
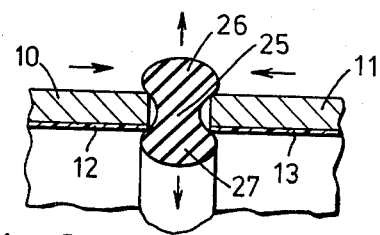

FIGS. 8 to 11 illustrate four different constructions of unreinforced resilient materials such as rubber or plastics. FIG. 8 illustrates a dumb-bell shaped cross-section ring 25 having head portions 26 and 27 at the exterior and interior respectively. Forcing together of the pipe ends 10 and 11 will cause a radially outward movement of the ring itself and urges the surfaces of the head against the lining.

Figure 9:
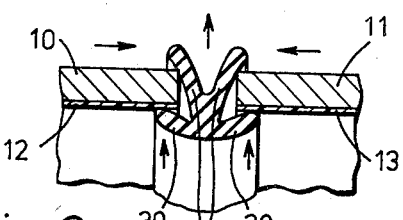

FIG. 9 shows a construction in which the body portion consists of two divergent arms 28, so that forcing together of the pipes 10 and 11 will bend out the axial arm portions 29 and 30.

Figure 10:
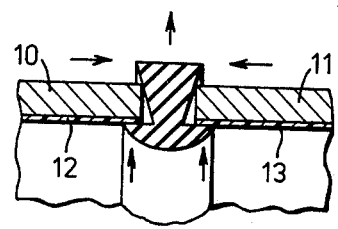
Figure 11:
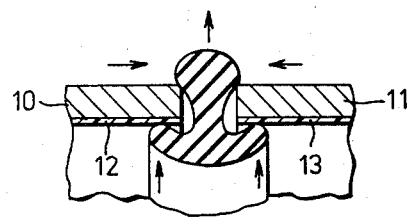

FIGS. 10 and 11 show two further constructions in which a head or divergent body portion is provided between the pipe ends so that forcing together of the pipe ends will cause a generally radial outward movement of the whole ring.

Figure 12:
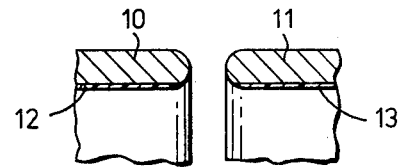
FIGS. 12 to 14 show three different ways of shaping the pipe ends to effect a radially outward force on a sealing member of the joint.
Figure 13:
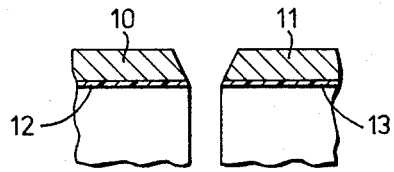
Figure 14:
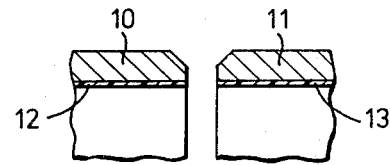

The affect of forcing the joint as a whole, or the reinforcement radially outwardly can be enhanced by shaping the pipe joint for example, as shown in FIG. 12, 13 or 14. FIG. 12 has rounded ends to the pipes, FIG. 13 a fully chamfered end and FIG. 14 a part-chamfered end. These shapes co-operate with the joint or parts thereof to cause the outward movement of the jointing member axially extending portions to engage the lining.

Figure 15:
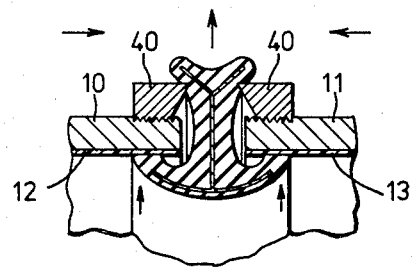
FIG. 15 is a view similar to FIGS. 1 to 11 showing a special attachment to the pipe wall for effecting the radially outward force.

FIG. 15 shows a further construction employing a seal of the general type illustrated in FIG. 1. In this arrangement a special attachment, in the form of a collar 40 is threaded onto each pipe end so that movement of the collar portions towards one another will force a seal radially outwardly.

Figure 16:
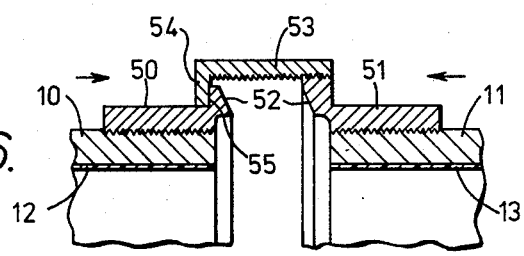
FIGS. 16 to 22 are schematic fragmentary cross-sectional views showing different ways of drawing the pipe ends axially towards one another.

Various arrangements for moving the pipe ends towards one another are illustrated in the remaining FIGS. 16 to 22. In FIG. 16 pipe 10, 11 has rings 50, 51 threaded thereon, these having co-operating mechanical stop portions 52. A tightening ring 53 has a radially inwardly extending flange 54 engaging in a surface 55 on ring 50 and is internally threaded to engage an external thread on the ring 51 so that rotation of the ring 53 pulls the two pipe ends together.

Figure 17:
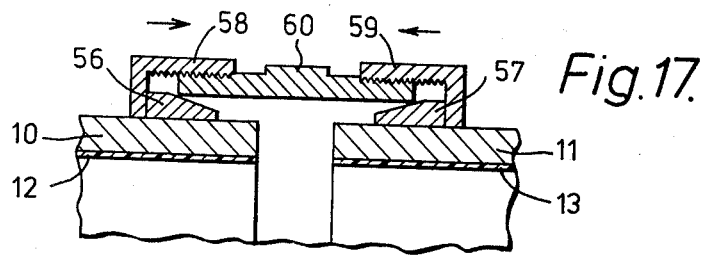

FIG. 17 shows an annular abutment 56 and 57 on the pipes 10 and 11 and these are engaged by radially inwardly extending flanges of internally threaded rings 58 and 59 and these engage an external thread on an intermediate ring 60 to draw the pipe ends 10 and 11 together.

Figure 18:
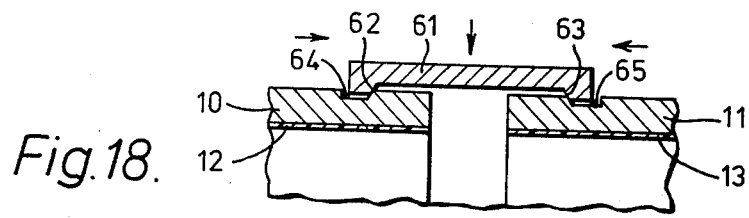
Figure 20:
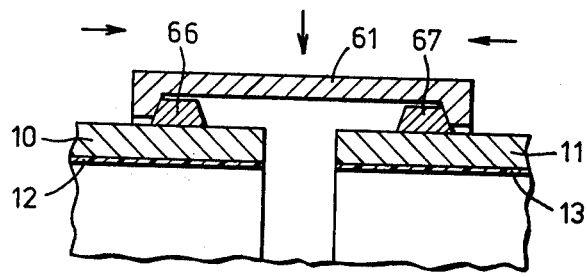

The construction of FIG. 18 includes a split clamp 61 which can be radially compressed and has chamfered surfaces 62 and 63 co-operating with chamfered surfaces on grooves 64 and 65 preformed in the pipes 10 and 11. Radial compression of the split clamp will cause axial movement of the pipes 10 and 11. FIG. 20 shows a generally similar arrangement except that rings 66 and 67 are shrunk onto the pipes 10 and 11. The split clamp operates in the same way.

Figure 19:
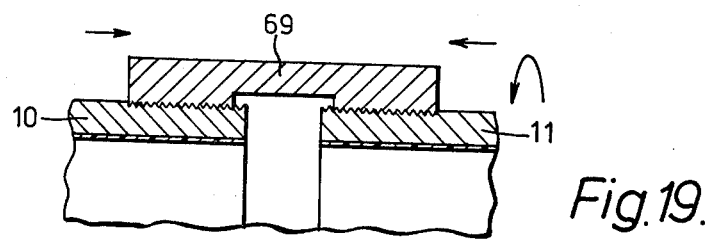

FIG. 19 shows a construction in which the pipe ends 10 and 11 are threaded and co-operate with a thread on a tightening ring 69. This construction, unlike the previous constructions, involves the rotation of one of the pipes to effect the tightening. This difficulty could be obviated by putting a lefthand thread on one pipe and a right hand thread on the other.

Figure 21:
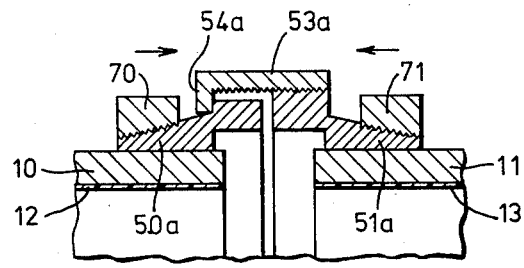

FIG. 21 shows an arrangement similar to that of FIG. 16 and like parts have been indicated by like reference numerals. In this construction, however, it is not necessary to thread the ends of the pipes but rather clamping of the rings 50a, 51a on the pipe is effected by rings 70 and 71 provided with tapered threads whereby screwing up of the members 70,71 clamps the rings 50a, 51a against the pipes 10 and 11 respectively.

Figure 22:
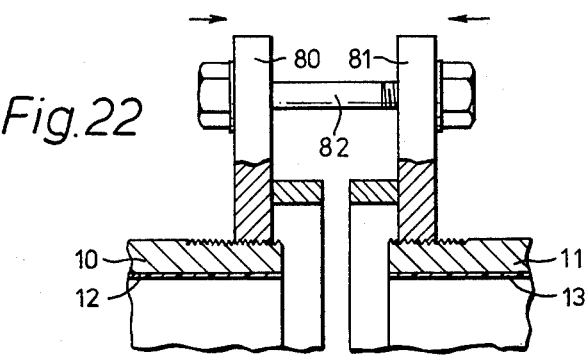

FIG. 22 illustrates flanges 80 and 81 of a conventional type screwed onto the ends of the pipes 10 and 11 respectively and held together by bolts 82 with associated nuts, mechanical stops being provided to prevent the ends engaging one another too tightly.

Figure 23:
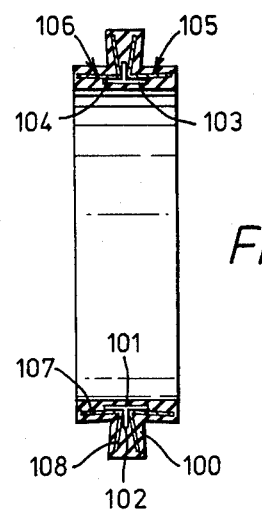
FIG. 23 is a cross-section through a presently preferred construction of joint according to the invention.
Figure 24:
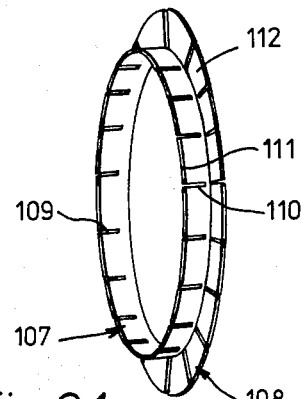
FIG. 24 is a perspective view of reinforcement of the joint of FIG. 23.

The presently preferred construction of joint is shown in FIGS. 23 and 24. Moulded into a resilient plastics material T-shaped cross-section annular member 100 are a T-shaped cross-section metal centering ring 101 having a central flange 102 extending radially outwardly and two axially extending portions 103, 104. Also moulded within member 100 are two spring sheet parts 105, 106, which are identical and arranged in back-to-back or mirror-image relation, one on each axial side of the flange 102 and radially outward of portions 103, 104 of ring 101. The parts each include an axially extending inner arm 107 and a body portion 108 extending generally radially outwardly therefrom, the two body portions extending at less than 90° from the inner arms, so that they diverge from one another.

Both the arm 107 and the body portion 108 of each part are provided with circumferentially spaced slits 109, 110 from their free edges, to a location just outwardly of the juncture 111, to define circumferentially spaced segments 112.

When the pipe ends are forced towards one another, this compresses member 100 (which increases the seal at the ends of the pipes) and urges the outer tips of portions 108 together.

We claim:

1. A joint for jointing two pipe ends, said joint comprising a resilient T-shaped annular member including a radial portion adapted to extend between the ends of the pipes, two oppositely extending axial portions at the radially inner part of the radial portion, the axial portions each being engageable within the interior of one of the two pipe ends, a metal reinforcement within said resilient annular member, said reinforcement comprising two axially spaced parts each having an axially extending inner arm and a body portion extending radially outwardly therefrom, the two body portions diverging with respect to one another, said body portions including a plurality of radial slits circumferentially spaced from one another and dividing the body portion into circumferentially spaced segments, whereby the axially extending portions of the T-shaped annular member are urged radially outwardly against the inner surface of the two pipe ends, as the two pipe ends are drawn axially towards one another.

2. A joint as claimed in claim 1, and further comprising a centering ring located within the two axially extending portions and a central flange on the centering ring extending radially outwardly between the two radially extending body portions.

3. A joint as claimed in claim 1, wherein said arms further comprise a plurality of axially extending slits circumferentially spaced from one another, said slits dividing the arms into circumferentially spaced segments.

4. A joint as claimed in claim 1, wherein said body portions are each formed of spring steel.

5. A joint for jointing two pipe ends, said joint comprising a resilient T-shaped annular member including a radial portion adapted to extend between the ends of the pipes, two oppositely extending axial portions at the radially inner part of the radial portion, the axial portions each being engageable within the interior of one of the two pipe ends, a metal reinforcement within said resilient annular member, said reinforcement comprising two axially spaced parts, each having an axially extending inner arm and a body portion extending radially outwardly therefrom, the two body portions diverging with respect to one another and a separate centering ring located within the two axially extending portions, a central flange on the centering ring extending radially outwardly between the two radially extending body portions of said two parts.

6. A joint as claimed in claim 5, wherein said body portions are each formed of spring steel.

* * * * *